(12) United States Patent
Oka

(10) Patent No.: US 7,484,851 B2
(45) Date of Patent: Feb. 3, 2009

(54) IMAGE FORMING DEVICE AND METHOD

(75) Inventor: Daizo Oka, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 11/807,471

(22) Filed: May 29, 2007

(65) Prior Publication Data

US 2007/0279510 A1 Dec. 6, 2007

(30) Foreign Application Priority Data

May 31, 2006 (JP) ............................. 2006-151015

(51) Int. Cl.
- *G03B 21/26* (2006.01)
- *G03B 21/20* (2006.01)
- *G03B 21/00* (2006.01)
- *G03B 17/00* (2006.01)
- *H04N 5/262* (2006.01)

(52) U.S. Cl. ..................... 353/30; 353/101; 353/121; 396/76; 396/86; 348/240.3

(58) Field of Classification Search .................. 353/30, 353/69, 70, 85, 100, 101, 121; 396/76, 86, 396/103; 352/179; 359/697; 348/211.99, 348/240.3

See application file for complete search history.

(56) References Cited

U.S. PATENT DOCUMENTS 6,522,838 B1 * 2/2003 Natsume et al. ............... 396/76

6,701,073 B2 * 3/2004 Natsume et al. ............... 396/76

FOREIGN PATENT DOCUMENTS

| JP | 05-260423 A | 10/1993 |
|---|---|---|
| JP | 10-049068 | 2/1998 |
| JP | 2005-328341 | 11/2005 |
| JP | 2006025232 | 1/2006 |
| JP | 2006133273 | 5/2006 |

* cited by examiner

*Primary Examiner*—Melissa Jan Koval
(74) *Attorney, Agent, or Firm*—Lerner, David, Littenberg, Krumholz & Mentlik, LLP

(57) ABSTRACT

An image forming device for forming an image on an image forming object by irradiating the image forming object with a luminous flux corresponding to the image, the image forming device including: a lens having a zoom lens and a focus lens; a driving system; a position sensor; a controlling circuit; and a memory. When the controlling circuit receives a first command, the controlling circuit sets the target values, controls the driving system using the set target values, and performs control to record the respective positions detected by the position sensor in timing of ending the controlling of the driving system in the memory as a first adjustment value. When the controlling circuit receives a second command to read contents of the memory, the controlling circuit reads the first adjustment value from the memory, and controls the driving system using the first adjustment value as the target values.

7 Claims, 5 Drawing Sheets

IMAGE FORMING DEVICE AND METHOD

CROSS-REFERENCE TO RELATED APPLICATIONS

The present application claims priority from Japanese Patent Application No. JP 2006-151015 filed in the Japanese Patent Office on May 31, 2006, the entire content of which is incorporated herein by reference.

BACKGROUND OF THE INVENTION

1. Field of the Invention

The present invention relates to an image forming device and an image forming method, and particularly to an image forming device and an image forming method that simplify adjustment for adjusting picture size and focus on an image forming object.

2. Description of the Related Art

Video contents in related art such as a movie or the like in a movie theater or the like are generally projected onto a screen by a film projector or the like.

Recently, as video contents have been digitized, techniques for using a projector (for example, Japanese Patent Laid-open No. Hei 05-260423) in a movie theater or the like, so-called digital cinema techniques have continued to be studied and developed. Incidentally, a projector that can be used in digital cinema technology will hereinafter be referred to specifically as a cinema projector.

SUMMARY OF THE INVENTION

However, there are various types of video contents that can be projected on a screen. For example, movies are broadly classified into types with different aspect ratios such as "Cinescope" and "Vista" as shown in FIG. 1.

Therefore, adjustment for adjusting picture size and focus on a screen is demanded for each of types of video contents individually. When a film projector in the past or a cinema projector in the past is used, such adjustment needs to be made each time a type of content is changed in a case of changing the content to be projected. Further, human labor work for the adjustment demands much time.

Specifically, for example, a film projector in the past or the like is provided with lenses of fixed focus corresponding to respective types of video contents, and also has a turret or the like for changing the lenses. Therefore time-consuming work is necessary in that each time a type of content is changed in a case of changing the content to be projected, a change is made to a lens of fixed focus corresponding to a type after the change, using a turret or the like.

Some cinema projectors in related art have a function of changing a zoom magnification and a focus magnification of a lens. However, even such cinema projectors demand time-consuming work of gradually changing the zoom magnification and the focus magnification of the lens while checking display of a content actually projected on a screen each time a type of content is changed in a case of changing the content to be projected.

The problems described above are caused as usual not only by the above-described devices but also by image forming devices in general that form an image on an image forming object. That is, the image forming devices in the past have a problem in that adjustment for adjusting picture size and focus on an image forming object is demanded for each type of image, and each adjustment operation involves time-consuming work.

The present invention has been made in view of such a situation, and simplifies adjustment for adjusting picture size and focus on an image forming object.

According to an embodiment of the present invention, there is provided an image forming device for forming an image on an image forming object by irradiating the image forming object with a luminous flux corresponding to the image, the image forming device including: a lens; a driving system; a position sensor; a controlling circuit; and a memory. The lens is configured to irradiate the image forming object with the luminous flux, the lens having a zoom lens that changes a zoom magnification by changing a position of the zoom lens and a focus lens that changes a focus magnification by changing a position of the focus lens. The driving system is configured to drive each of the zoom lens and the focus lens. The position sensor is configured to detect respective positions of the zoom lens and the focus lens. The controlling circuit is configured to make the respective positions detected by the position sensor coincide with respective target values by receiving a predetermined command and controlling the driving system. The memory is recordable information. When the controlling circuit receives a first command to move at least one of the zoom lens and the focus lens, the controlling circuit sets the target values on a basis of the first command, controls the driving system using the set target values, and performs control to record the respective positions detected by the position sensor in timing of ending the controlling of the driving system in the memory as a first adjustment value. When the controlling circuit receives a second command to read contents of the memory, the controlling circuit reads the first adjustment value from the memory, and controls the driving system using the first adjustment value as the target values.

The image forming device further includes: a lamp as a source that produces the luminous flux; and a lamp power supply configured to supply power to the lamp. When the controlling circuit further receives a third command to change the luminous flux from the lamp, the controlling circuit changes the luminous flux from the lamp by controlling the power supplied by the lamp power supply, and performs control to record a value indicating the power supplied in timing of ending the controlling of the power in the memory as a second adjustment value in correspondence with the first adjustment value. When the controlling circuit receives the second command, the controlling circuit further reads the second adjustment value in addition to the first adjustment value from the memory, and further performs control to make the power supplied by the lamp power supply become power corresponding to the second adjustment value.

The first to third commands are issued from another device, and the image forming device further includes a communicating circuit configured to receive the first to third commands from the other device and providing the first to third commands to the controlling circuit.

The communicating circuit and the other device are connected to each other via a predetermined network.

The image forming device is a projector using a screen as the image forming object.

An image forming method according to an embodiment of the present invention is an image forming method of an image forming device for forming an image on an image forming object by irradiating the image forming object with a luminous flux corresponding to the image. The image forming device includes: a lens; a driving system; a position sensor; a controlling circuit; and a memory. The lens is configured to irradiate the image forming object with the luminous flux, the lens having a zoom lens that changes a zoom magnification by changing a position of the zoom lens and a focus lens that changes a focus magnification by changing a position of the focus lens. The driving system is configured to drive each of the zoom lens and the focus lens. The position sensor is configured to detect respective positions of the zoom lens and the focus lens. The controlling circuit is configured to make the respective positions detected by the position sensor coincide with respective target values by receiving a predetermined command and controlling the driving system. The memory is recordable information. In this case, the image forming method includes the steps of: setting the target values on a basis of the first command, when the controlling circuit receives a first command to move at least one of the zoom lens and the focus lens; controlling the driving system using the set target values; performing control to record the respective positions detected by the position sensor in timing of ending the controlling of the driving system in the memory as an adjustment value; reading the adjustment value from the memory, when the controlling circuit receives a second command to read contents of the memory; and controlling the driving system using the adjustment value as the target values.

In the image forming device and the image forming method according to the foregoing embodiments of the present invention, an image forming object is irradiated with a luminous flux corresponding to an image, and the image is formed on the image forming object. The image forming device forming such an image includes: a lens; a driving system; a position sensor; a controlling circuit; and a memory. The lens is configured to irradiate the image forming object with the luminous flux, the lens having a zoom lens that changes a zoom magnification by changing a position of the zoom lens and a focus lens that changes a focus magnification by changing a position of the focus lens. The driving system is configured to drive each of the zoom lens and the focus lens. The position sensor is configured to detect respective positions of the zoom lens and the focus lens. The controlling circuit is configured to make the respective positions detected by the position sensor coincide with respective target values by receiving a predetermined command and controlling the driving system. The memory is recordable information. In this case, the following process is performed by the controlling circuit. When a first command to move at least one of the zoom lens and the focus lens is issued, the target values are set on a basis of the first command, the driving system is controlled using the set target values, and the respective positions detected by the position sensor in timing of ending the controlling of the driving system are recorded in the memory as an adjustment value. When a second command to read contents of the memory is issued, the adjustment value is read from the memory, and the driving system is controlled using the adjustment value as the target values.

As described above, according to the present invention, it is possible to make adjustment for adjusting picture size and focus on an image forming object. In particular, such adjustment can be made more easily.

DETAILED DESCRIPTION OF PREFERRED EMBODIMENTS

Figure 1:
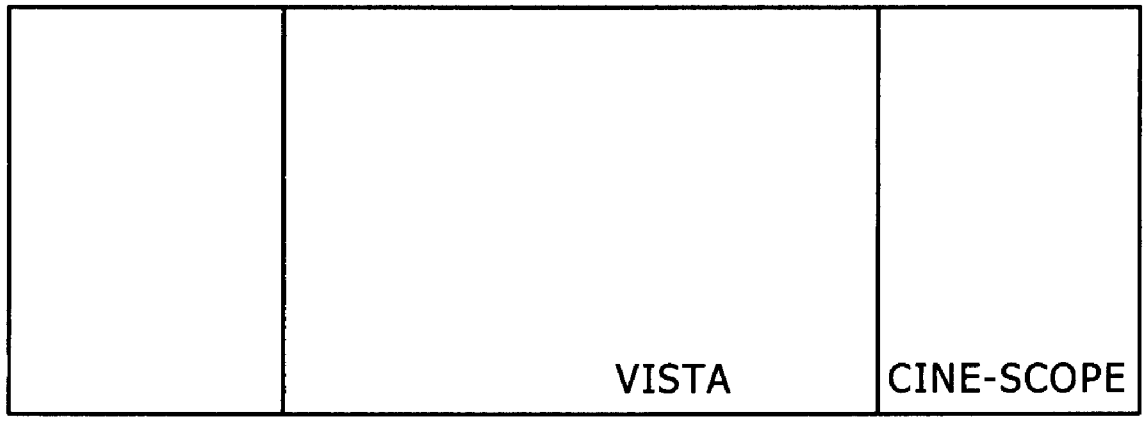
FIG. 1 is a diagram of assistance in explaining a difference between "Cine-scope" and "Vista"

Preferred embodiments of the present invention will hereinafter be described. Correspondences between constitutional requirements described in claims and concrete examples in the specification or the drawings are illustrated as follows. This description is to confirm that the concrete examples supporting inventions described in the claims are described in the specification or the drawings. Therefore, even when there is a concrete example described in the specification or the drawings but not described here as corresponding to a constitutional requirement, it does not signify that the concrete example does not correspond to the constitutional requirement. Conversely, even when a concrete example is described here as corresponding to a constitutional requirement, it does not signify that the concrete example does not correspond to constitutional requirements other than that constitutional requirement.

Further, this description does not signify that inventions corresponding to concrete examples described in the specification or the drawings are all described in the claims. In other words, this description does not negate presence of inventions corresponding to concrete examples described in the specification or the drawings but not described in the claims of the present application, that is, presence of inventions to be presented in a divisional application or to be added by amendments in the future.

An image forming device (projector 1 in FIG. 2, for example) according to an embodiment of the present invention is an image forming device for forming an image on an image forming object (screen 2 in FIG. 2, for example) by irradiating the image forming object with a luminous flux corresponding to the image, the image forming device including: a lens; a driving system; a position sensor; a controlling circuit; and a memory. The lens (lens 15 in FIG. 2, for example) irradiates the image forming object with the luminous flux, the lens has a zoom lens (zoom lens 15-Z in FIG. 2, for example) for changing a zoom magnification by changing a position of the zoom lens and a focus lens (focus lens 15-F in FIG. 2, for example) for changing a focus magnification by changing a position of the focus lens. The driving system (motors 16-z and 16-F in FIG. 2, for example) drives each of the zoom lens and the focus lens. The position sensor (position sensors 18-Z and 18-F in FIG. 2, for example) detects respective positions of the zoom lens and the focus lens. The controlling circuit (CPU 11 in FIG. 2, for example) makes the respective positions detected by the position sensor coincide with respective target values by receiving a predetermined command and controlling the driving system. The memory (recording memory 19 in FIG. 2, for example) is recordable information. When the controlling circuit receives a first command to move at least one of the zoom lens and the focus lens, the controlling circuit sets the target values on a basis of the first command, controls the driving system using the set target values, and performs control to record the respective positions detected by the position sensor in timing of ending the controlling of the driving system in the memory as a first adjustment value (performs an initial adjustment process in FIG. 3, particularly processes of steps S2 and S6, for example). When the controlling circuit receives a second command to read contents of the memory, the controlling circuit reads the first adjustment value from the memory, and controls the driving system using the first adjustment value as the target values (performs an adjustment process in FIG. 4, particularly a process of step S24 and a zoom/focus process in step S25, for example).

The image forming device further includes: a lamp (lamp 14 in FIG. 2, for example) as a source that produces the luminous flux; and a lamp power supply (lamp power supply 13 in FIG. 2, for example) for supplying power to the lamp. When the controlling circuit further receives a third command to change the luminous flux from the lamp, the controlling circuit changes the luminous flux from the lamp by controlling the power supplied by the lamp power supply. The controlling circuit also performs control to record a value indicating the power supplied in timing of ending the controlling of the power in the memory as a second adjustment value in correspondence with the first adjustment value (performs the initial adjustment process in FIG. 3, particularly processes of steps S4 and S6, for example). When the controlling circuit receives the second command, the controlling circuit further reads the second adjustment value in addition to the first adjustment value from the memory, and further performs control to make the power supplied by the lamp power supply become power corresponding to the second adjustment value (performs the adjustment process in FIG. 4, particularly the process of step S24 and a lamp adjustment process in step S25, for example).

The first to third commands are issued from another device (personal computer 4-1 or the like in FIG. 2, for example), and the image forming device further includes a communicating circuit (NET CPU 12 in FIG. 2, for example) for receiving the first to third commands from the other device, and providing the first to third commands to the controlling circuit.

Figure 2:
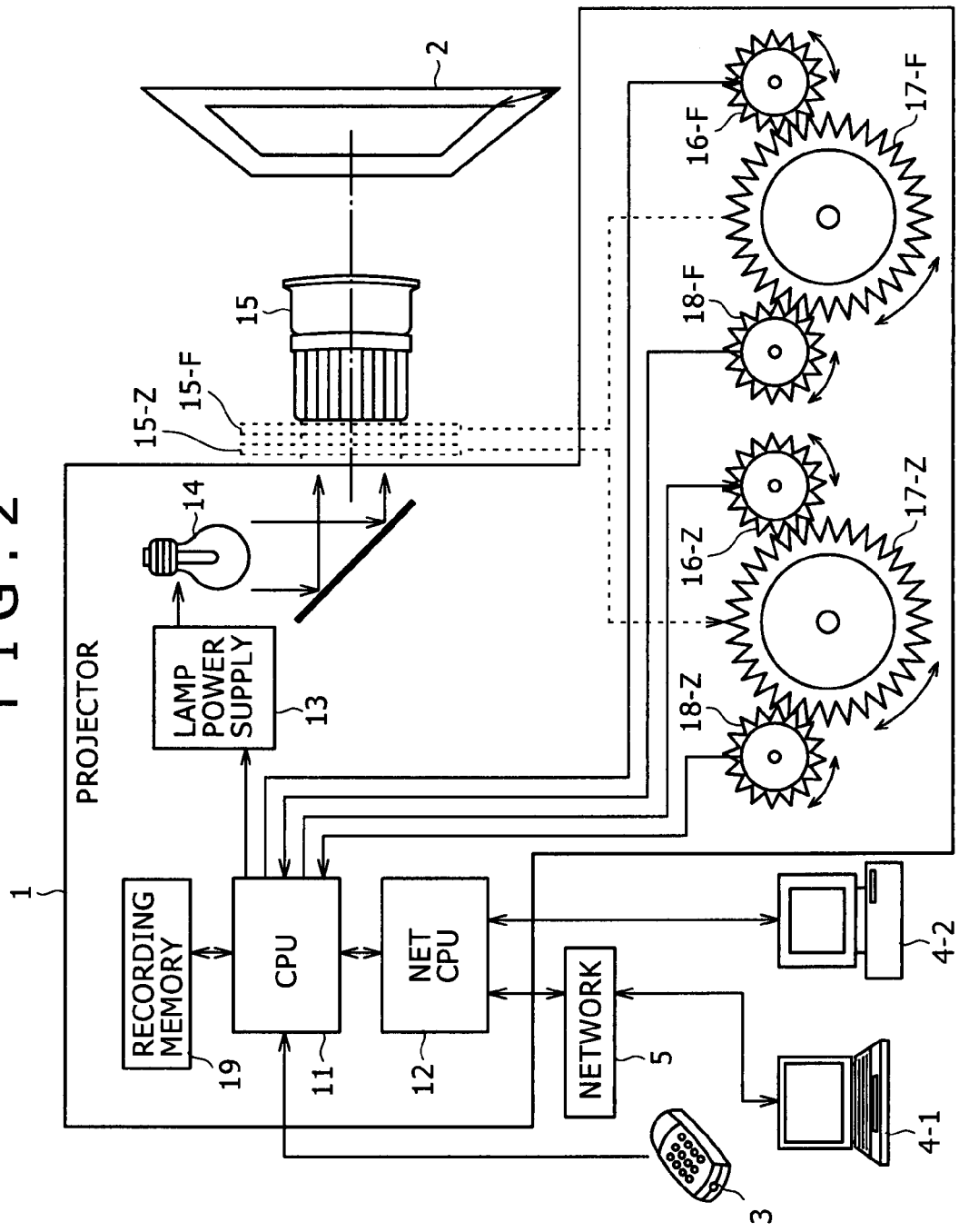
FIG. 2 is a diagram showing an example of constitution of an information processing system to which the present invention is applied.

The communicating circuit and the other device are connected to each other via a predetermined network (network 5 in FIG. 2, for example).

An image forming method according to an embodiment of the present invention is a method corresponding to the above-described image forming device according to one embodiment of the present invention.

Embodiments of the present invention will hereinafter be described with reference to FIGS. 2 to 4.

FIG. 2 is a diagram showing an example of constitution of an information processing system in a case where the present invention is applied to a field of digital cinema.

The information processing system in the example of FIG. 2 includes a projector 1, a screen 2, a remote control 3, and personal computers 4-1 and 4-2.

The projector 1 projects video contents of a movie or the like onto the screen 2. That is, the projector 1 irradiates the screen 2 with a luminous flux corresponding to the video contents, and thereby forms video constituting the video contents on the screen 2. That is, the projector 1 is one embodiment of an image forming device to which the present invention is applied in a case where the screen 2 is used as an image forming object.

As will be described later in detail, the projector 1 has a function of changing a zoom magnification and a focus magnification (the function will hereinafter be referred to as a zoom/focus adjusting function) and a function of changing a lamp output (the function will hereinafter be referred to as a lamp adjusting function). That is, to control the two functions, the information processing system in the example of FIG. 2 is provided with the remote control 3 and the personal computers 4-1 and 4-2. In other words, types and the number of devices controlling the two functions are not specifically limited to the example of FIG. 2 as long as the devices can control the two functions.

In addition, a method of controlling the two functions is not specifically limited. For example, the present embodiment employs a method in which the following commands are each issued in response to an operation of a human such as an operator or the like, and the functions are controlled by the respective commands.

That is, suppose that in the present embodiment, for example, a command to change the zoom magnification in a plus direction or a minus direction and a command to change the focus magnification in a plus direction or a minus direction are issued to implement the zoom/focus adjusting function. Incidentally, the commands for realizing the zoom/focus adjusting function will hereinafter be referred to collectively as a zoom/focus adjusting command.

Further, for example, in the lamp adjusting function of the present embodiment, lamp output values of N levels (N is an integral value of two or more) are defined in advance, and adjustment is made with the N levels. Thus, suppose that in the present embodiment, for example, information indicating a value selected by the operator or the like from among 1 to N as lamp output values is issued as a command to implement such a lamp adjusting function. Incidentally, such a command will hereinafter be referred to as a lamp output value selection command.

Thus, in the present embodiment, for example, the zoom/focus adjustment command or the lamp output value selection command is issued from the remote control 3 in response to an operation of pressing the remote control 3 by the operator or the like, and supplied to the projector 1, or more specifically a CPU 11 to be described later.

In addition, for example, the zoom/focus adjustment command or the lamp output value selection command is issued from the personal computer 4-1 in response to an operation of pressing the personal computer 4-1 by the operator or the like, and supplied by serial communication or the like to the projector 1, or more specifically a NET CPU 12 to be described later.

Further, for example, the zoom/focus adjustment command or the lamp output value selection command is issued from the personal computer 4-2 in response to an operation of pressing the personal computer 4-2 by the operator or the like, and supplied via a network 5 to the projector 1, or more specifically the NET CPU 12 to be described later.

Points to be noted are as follows. The projector 1 in a movie theater or the like is often installed at a position distant from the screen 2. Thus, to make zoom/focus adjustment or lamp adjustment generally demands a first operator who is present in the vicinity of the screen 2 and actually checks video projected on the screen 2, and a second operator who is present in the vicinity of the projector 1 and operates the projector 1 while listening to the first operator. However, when there is for example a connection terminal or the like for connection to the network 5 in the vicinity of the screen 2, connection of the personal computer 4-1 to the connection terminal or the like enables only one operator to operate the personal computer while actually checking the video projected on the screen 2, that is, make zoom/focus adjustment or lamp adjustment.

In response to the zoom/focus adjustment command and the lamp output value selection command from the remote control 3 or the personal computer 4-1 or 4-2, the projector 1 implements the zoom/focus adjusting function and the lamp adjusting function. To implement these functions, the projector 1 in the example of FIG. 2 is provided with units from the CPU 11 to a recording memory 19.

The CPU (Central Processing Unit) 11 performs various processes according to a program recorded in the recording memory 19 or a ROM (Read Only Memory) or the like not shown in the figure. Incidentally, concrete examples of contents recorded in the recording memory 19 and contents processed by the CPU 11 will be described later.

The NET CPU 12 performs various processes necessary to perform serial communication with the personal computer 4-2 and perform communication with the personal computer 4-1 via the network 5. Specifically, for example, when the zoom/focus adjustment command and the lamp output value selection command are issued from the personal computer 4-1 or 4-2, the NET CPU 12 receives these commands and then supplies the commands to the CPU 11.

Incidentally, while the CPU 11 and the NET CPU 12 are independent of each other in the present embodiment, the CPU 11 and the NET CPU 12 may be integrated into one unit. That is, the communication function of the NET CPU 12 may be delegated to the CPU 11.

A lamp power supply 13 supplies power to a lamp 14 under control of the CPU 11. This lamp 14 is a light source producing a luminous flux corresponding to video contents. Luminance adjustment on the screen 2 can be made by adjusting the luminous flux. In this case, the luminous flux of the lamp 14 can be adjusted by the output (power supplied) by the lamp power supply 13 to the lamp 14, for example. In the present embodiment, for example, the output of the lamp power supply 13, that is, a lamp output value can be adjusted to N levels. The CPU 11 adjusts the luminous flux of the lamp 14 by performing a process for supplying power corresponding to a predetermined lamp output value (value of one of 1 to N) to the lamp 14. Accordingly, such a process will hereinafter be referred to as a lamp adjustment process.

It is to be noted that the value of one of 1 to N determined as lamp output value differs between a time of an initial adjustment and a time of an adjustment made after the completion of the initial adjustment.

Specifically, at the time of an initial adjustment, a value (value of one of 1 to N) specified by a lamp output value selection command from the remote control 3, the personal computer 4-1, or the personal computer 4-2 (hereinafter referred to as the remote control 3 or the like) is determined as lamp output value. The lamp adjustment process is performed using the thus determined lamp output value. The lamp adjustment process at this time corresponds to step S4 in FIG. 3 to be described later.

As will be described later in detail as a SAVE process in step S6 in FIG. 3, the lamp output value used at the time of the initial adjustment is recorded as an initial adjustment value in the recording memory 19.

Hence, when an explicit instruction to use the initial adjustment value is thereafter given, that is, when an instruction is given by a LOAD command to be described later in the present embodiment, for example, the CPU 11 can read the initial adjustment value from the recording memory 19 and perform a lamp adjustment process using the initial adjustment value as lamp output value. The lamp adjustment process at this time corresponds to step S25 in FIG. 4 to be described later.

The necessity of the lamp adjustment process will be briefly described below.

For example, in the present embodiment, the information processing system of FIG. 1 is applied to a field of digital cinema. In such a field of digital cinema, a standard referred to as DCI Spec is defined by an organization referred to as DCI (Digital Cinema Initiatives). The definition specifies that "white peak luminance at the center of a screen be 48 cd/m$^2$ (14 ft-L) as a video parameter to be referred to". 14 ft-L=48 cd/m$^2$ means that the brightness of about 48 candles per square meter is demanded at the center of a screen. In other words, the brightness of video contents projected on the screen 2 in FIG. 1 needs to be maintained at a constant level at all times irrespective of the type of the video contents, that is, even when picture size or the like is increased or decreased.

Therefore, the lamp adjustment process needs to be performed for each of types of video contents individually so that the luminance of the screen 2 is constant for each of types of video contents, that is, the luminance of the screen 2 for each of types of video contents is equal to luminances for other types.

The luminous flux from the lamp 14 as a result of such lamp adjustment is applied to the screen 2 via a lens 15. The lens 15 has a function of varying each of a zoom magnification and a focus magnification in a certain range. That is, the lens 15 has a zoom lens 15-Z whose position can be adjusted within a certain range to vary the zoom magnification, and a focus lens 15-F whose position can be adjusted within a certain range to vary the focus magnification.

The position of the zoom lens 15-Z is adjusted by a mechanism 17-Z (hereinafter referred to as a zoom mechanism 17-Z) provided in a barrel of the lens 15. Specifically, the zoom mechanism 17-Z is rotated as a motor 16-Z rotates on an axis thereof, and the position of the zoom lens 15-Z is changed by an amount corresponding to an angle of rotation of the zoom mechanism 17-Z. The rotation of the motor 16-Z is controlled by the CPU 11. Specifically, a position sensor 18-Z formed by an encoder or the like detects the angle of rotation of the zoom mechanism 17-Z, and then supplies the rotation angle to the CPU 11. The CPU 11 controls the rotation of the motor 16-Z so as to make the rotation angle (feedback value) from the position sensor 18-Z coincide with a target angle (target value). That is, the position of the zoom lens 15-z is adjusted by control of a feedback loop control system including the CPU 11, the motor 16-Z, the zoom mechanism 17-Z, and the position sensor 18-Z.

Similarly, the position of the focus lens 15-F is adjusted by a mechanism 17-F (hereinafter referred to as a focus mechanism 17-F) provided in the barrel of the lens 15. Specifically, the focus mechanism 17-F is rotated as a motor 16-F rotates on an axis thereof, and the position of the focus lens 15-F is changed by an amount corresponding to an angle of rotation of the focus mechanism 17-F. The rotation of the motor 16-F is controlled by the CPU 11. Specifically, a position sensor 18-F formed by an encoder or the like detects the angle of rotation of the focus mechanism 17-F, and then supplies the rotation angle to the CPU 11. The CPU 11 controls the rotation of the motor 16-F so as to make the rotation angle (feedback value) from the position sensor 18-F coincide with a target angle (target value). That is, the position of the focus lens 15-F is adjusted by control of a feedback loop control system including the CPU 11, the motor 16-F, the focus mechanism 17-F, and the position sensor 18-F.

Incidentally, a process of adjusting the position of the zoom lens 15-Z by the feedback loop control system including the CPU 11, the motor 16-Z, the zoom mechanism 17-Z, and the position sensor 18-Z and a process of adjusting the position of the focus lens 15-F by the feedback loop control system including the CPU 11, the motor 16-F, the focus mechanism 17-F, and the position sensor 18-F will hereinafter be referred to collectively as a zoom/focus adjustment process. While operation of the zoom/focus adjustment process is performed by the whole of the feedback loop control systems, the whole of the feedback loop control systems will hereinafter be abbreviated to the CPU 11 for simplicity of description.

It is to be noted that a method of setting a target angle for the zoom mechanism 17-Z or the focus mechanism 17-F in the zoom/focus adjustment process differs between a time of an initial adjustment and a time of an adjustment made after the completion of the initial adjustment.

Specifically, at the time of an initial adjustment, the CPU 11 sets a target angle for the zoom mechanism 17-Z or the, focus mechanism 17-F on the basis of a zoom/focus adjustment command from the remote control 3 or the like. Then, the CPU 11 performs the zoom/focus adjustment process on the basis of the thus set target angle. The zoom/focus adjustment process at this time corresponds to step S2 in FIG. 3 to be described later.

As will be described later in detail as a SAVE process in step S6 in FIG. 3, an output value of the position sensor 18-Z or 18-F which value corresponds to the zoom magnification or the focus magnification set at the time of the initial adjustment, that is, the angle of the zoom mechanism 17-Z or the focus mechanism 17-F at that time is recorded as an initial adjustment value in the recording memory 19.

Hence, when an explicit instruction to use the initial adjustment value is thereafter given, that is, when an instruction is given by a LOAD command to be described later in the present embodiment, for example, the CPU 11 reads the initial adjustment value from the recording memory 19, and then sets the initial adjustment value as a target angle for the zoom mechanism 17-Z or the focus mechanism 17-F. Then, the CPU 11 performs the zoom/focus adjustment process on the basis of the thus set target angle. The zoom/focus adjustment process at this time corresponds to step S25 in FIG. 4 to be described later.

In other words, it suffices to perform the zoom/focus adjustment process on the basis of the zoom/focus adjustment command or the initial adjustment value recorded in the recording memory 19, and control itself for adjusting the position of the zoom lens 15-Z and the focus lens 15-F may be arbitrary. That is, a control system for adjusting the position of the zoom lens 15-Z and the focus lens 15-F is not specifically limited to the example of FIG. 2, and a control system suffices which can perform control on the basis of the zoom/focus adjustment command or the initial adjustment value recorded in the recording memory 19.

In this case, the value recorded in the recording memory 19 as the initial adjustment value of the zoom/focus adjustment process is a value indicating the zoom magnification or the focus magnification determined at the time of the initial adjustment, that is, a value indicating the position of the zoom lens 15-Z or the focus lens 15-F at that time. Such a value will hereinafter be referred to as a zoom/focus position value. That is, the output value of the position sensor 18-Z or 18-F in the example of FIG. 2 is one example of the zoom/focus position value.

As described above, the recording memory 19 associates the zoom/focus position value and the lamp output value at the time of initial adjustment with each other, and records therein the zoom/focus position value and the lamp output value associated with each other as initial adjustment values.

It is to be noted that the initial adjustment does not refer to a first adjustment, but refers to all adjustments implemented by the zoom/focus adjustment process performed on the basis of the zoom/focus adjustment command and the lamp adjustment process performed on the basis of the lamp output value selection command.

Accordingly, the zoom/focus adjustment process performed on the basis of the zoom/focus adjustment command and the lamp adjustment process performed on the basis of the lamp output value selection command will hereinafter be referred to collectively as an initial adjustment process. Details of the initial adjustment process will be described later with reference to FIG. 3. Even after an initial adjustment value is recorded in the recording memory 19, the zoom/focus adjustment process is performed each time the zoom/focus adjustment command is reissued, and the initial adjustment value in the recording memory 19 is overwritten with a zoom/focus position value as a result of performing the zoom/focus adjustment process. Similarly, the lamp adjustment process is performed each time the lamp output value selection command is reissued, and the initial adjustment value in the recording memory 19 is overwritten with a lamp output value used in the lamp adjustment process. That is, each time the zoom/focus adjustment command or the lamp output value selection command is reissued, the initial adjustment value in the recording memory 19 is updated. However, to be more exact, as far as the present embodiment is concerned, the initial adjustment value in the recording memory 19 is updated only when a command to overwrite the initial adjustment value (SAVE command to be described later) is issued.

It is further to be noted that the recording memory 19 can record therein for example M initial adjustment values (M is an integral value of one or more, and is 20 in the present embodiment) in such a manner as to distinguish the M initial adjustment values from each other. It is thereby possible to record respective initial adjustment values for M types of video contents, for example, in the recording memory 19 individually. For example, an initial adjustment value for "Cine-scope" and an initial adjustment value for "Vista" in the example of FIG. 1 can be recorded individually in the recording memory 19.

Hence, when changing a type of video content to be projected onto the screen 2 from a first type to a second type, it suffices for the operator or the like to give the projector 1 an instruction to use an initial adjustment value for the second type among the M initial adjustment values recorded in the recording memory 19 as described above. Incidentally, suppose that in the present embodiment, for example, such an instruction is given to the CPU 11 in the projector 1 by issuing a special command from the remote control 3 or the like. Such a special command will hereinafter be referred to as a LOAD command.

When such a LOAD command is issued, an initial adjustment value for a type specified by the LOAD command among the initial adjustment values recorded in the recording memory 19 is read. Then, the zoom/focus adjustment process and the lamp adjustment process using the initial adjustment value are each performed. Incidentally, the zoom/focus adjustment process and the lamp adjustment process performed on the basis of such a LOAD command will be referred to as an adjustment process. Details of the adjustment process will be described later with reference to FIG. 4.

That is, focusing attention on a predetermined type of video content, when the operator or the like once makes initial adjustment for adjusting picture size and focus on the screen 2, that is, when the projector 1 once performs the initial adjustment process corresponding to the initial adjustment, parameter values used at the time of the initial adjustment are recorded as initial adjustment value in the recording memory 19. Thus, when the operator or the like thereafter projects a predetermined type of video content, the operator or the like does not need at all to make adjustment for adjusting picture size and focus on the screen 2 again, and it suffices for the operator or the like to simply perform a simple operation for issuing the LOAD command, that is, for example an operation of pressing the remote control 3 in this case.

An example of each of the initial adjustment process and the adjustment process described above among processes of the projector 1 in FIG. 2 will next be described referring to flowcharts of FIG. 3 and FIG. 4 in this order.

As described above, the initial adjustment process of FIG. 3 is performed by the projector 1 when the operator or the like makes initial adjustment for adjusting picture size and focus on the screen 2 for a predetermined type of video content, for example. That is, the initial adjustment process is performed independently for each of a plurality of types of video contents, and as a result, respective initial adjustment values for the plurality of types of video contents are individually recorded in the recording memory 19.

Specifically, in step S1, the CPU 11 in the projector 1 in FIG. 2 determines whether the zoom/focus adjustment command is issued.

When it is determined in step S1 that the zoom/focus adjustment command is not issued yet, the process proceeds to step S3. A process from step S3 on down will be described later.

On the other hand, when the zoom/focus adjustment command is issued from the remote control 3 or the like, a result of determination in step S1 is YES, and thus the process proceeds to step S2. In step S2, the CPU 11 performs the above-described zoom/focus adjustment process.

Incidentally, while conditions for ending step S2 are not specifically limited, suppose that the following conditions are employed in the present embodiment, for example. As long as the zoom/focus adjustment command continues to be issued, or more specifically, as long as the operator or the like continues operating the remote control 3 or the like in this case, for example, the process of step S2 continues to be performed, and the zoom magnification or the focus magnification continues to be changed. Then, in timing in which the issuing of the zoom/focus adjustment command is ended, that is, in timing in which the operation of the remote control 3 or the like is ended in this case, the process of step S2 is ended. That is, in the present embodiment, a condition that the issuing of the zoom/focus adjustment command be ended is the condition for ending step S2.

When such an ending condition is satisfied and thus the process of step S2 is ended, the process proceeds to step S5.

In step S5, the CPU 11 determines whether a SAVE command is issued.

The SAVE command refers to a command to record a lamp output value and output values of the position sensors 18-Z and 18-F at the time of issuing the SAVE command in the recording memory 19 as initial adjustment value for one predetermined type among the M types.

That is, when the operator or the like determines that a zoom magnification and a focus magnification at a present time will do, or in other words, when the operator or the like desires to register the zoom magnification and the focus magnification at the present time, the operator or the like can issue the SAVE command from the remote control 3 or the like by operating the remote control 3 or the like.

When such a SAVE command is issued, a result of determination in the process of step S5 is YES, and thus the process proceeds to step S6. In step S6, the CPU 11 performs a SAVE process.

The SAVE process refers to a process for recording the lamp output value and the output values of the position sensors 18-Z and 18-F at the time of issuing the SAVE command in the recording memory 19 as initial adjustment value for one predetermined type among the M types.

In step S7, the CPU 11 determines whether an instruction to end the process is given.

A condition for the determination in step S7 is not specifically limited. However, suppose that in the present embodiment, for example, a condition that a state of power supply of the projector 1 be an off state is used as a condition for determining that the instruction to end the process is given.

That is, when the state of power supply of the projector 1 becomes the off state, it is determined in step S7 that the instruction to end the process is given, and thus the initial adjustment process is ended.

On the other hand, as long as the state of power supply of the projector 1 is an on state, it is determined in step S7 that the instruction to end the process is not given yet, and thus the process returns to step S1 to repeat the process from step S1 on down.

Incidentally, when the operator or the like determines that the zoom magnification and the focus magnification at the present time are not sufficiently adjusted and are desired to be further adjusted, or in other words, when the operator or the like determines that the zoom magnification and the focus magnification at the present time are not desired to be registered, it suffices for the operator or the like to reissue the zoom/focus adjustment command from the remote control 3 or the like. In this case, a result of determination in each of steps S5 and S7 is NO, and then a result of determination in the process of step S1 is YES, so that the zoom/focus adjustment process in step S2 is performed again.

Of course, the zoom/focus adjustment command can be reissued even after the performance of the SAVE process in step S6. Considering this, the SAVE process in step S6 may be performed each time the zoom/focus adjustment process in step S2 is performed, without using the SAVE command, that is, without performing the determination process in step S5.

The above description has been made of the initial adjustment process when attention is directed to zoom/focus adjustment. The initial adjustment process when attention is directed to lamp adjustment is basically the same process. Specifically, the process is performed as follows.

As described above, when a result of determination in step S1 is NO, the process proceeds to step S3. In step S3, the CPU 11 determines whether the lamp output value selection command is issued.

When a result of determination in step S3 is NO, the process proceeds to step S5, and the process from step S5 on down is performed.

On the other hand, when the lamp output value selection command is issued from the remote control 3 or the like, a result of determination in step S3 is YES, and thus the process proceeds to step S4. In step S4, the CPU 11 performs the above-described lamp adjustment process. Thereafter the process proceeds to step S5.

In step S5, the CPU 11 determines whether the SAVE command is issued.

When the operator or the like determines that a luminance at a present time on the screen 2 will do, or in other words, when the operator or the like desires to register a lamp output value at the present time, it suffices for the operator or the like to issue the SAVE command from the remote control 3. In this case, a result of determination in step S5 is YES, and the above-described SAVE process is performed in step S6.

On the other hand, when the operator or the like determines that the luminance at the present time on the screen 2 is not sufficiently adjusted and is desired to be further adjusted, or in other words, when the operator or the like determines that the lamp output value at the present time is not desired to be registered, it suffices for the operator or the like to reissue the lamp output value selection command from the remote control 3 or the like. In this case, a result of determination in each of steps S5, S7, and S1 is NO, and then a result of determination in the process of step S3 is YES, so that the lamp adjustment process in step S4 is performed again.

Of course, as with the zoom/focus adjustment command, the lamp output value selection command can be reissued even after the performance of the SAVE process in step S6. Considering this, the SAVE process in step S6 may be performed each time the lamp adjustment process in step S4 is performed, without using the SAVE command, that is, without performing the determination process in step S5.

An example of the adjustment process will next be described with reference to the flowchart of FIG. 4.

As described above, the adjustment process of FIG. 4 is performed when changing a type of video content to be projected onto the screen 2 in FIG. 2, for example, or specifically when changing from one of "Cine-scope" and "Vista" in FIG. 1 to the other, for example.

Specifically, in step S21, the CPU 11 in the projector 1 in FIG. 2 determines whether a LOAD command is issued.

When it is determined in step S21 that the LOAD command is not issued yet, the process proceeds to step S27. A process from step S27 on down will be described later.

In this case, employed as the LOAD command is for example a command that includes a type specified by the operator or the like among the M types, and which makes an initial adjustment value for the specified type, that is, the lamp output value and the output values of the position sensors 18-Z and 18-F which values are registered for the specified type read from the recording memory 19.

Hence, when such a LOAD command is issued from the remote control 3 or the like, a result of determination in step S21 is YES, and the process from step S22 on down is performed as follows.

In step S22, the CPU 11 determines whether the initial adjustment value for the type specified by the LOAD command is recorded in the recording memory 19.

Figure 3:
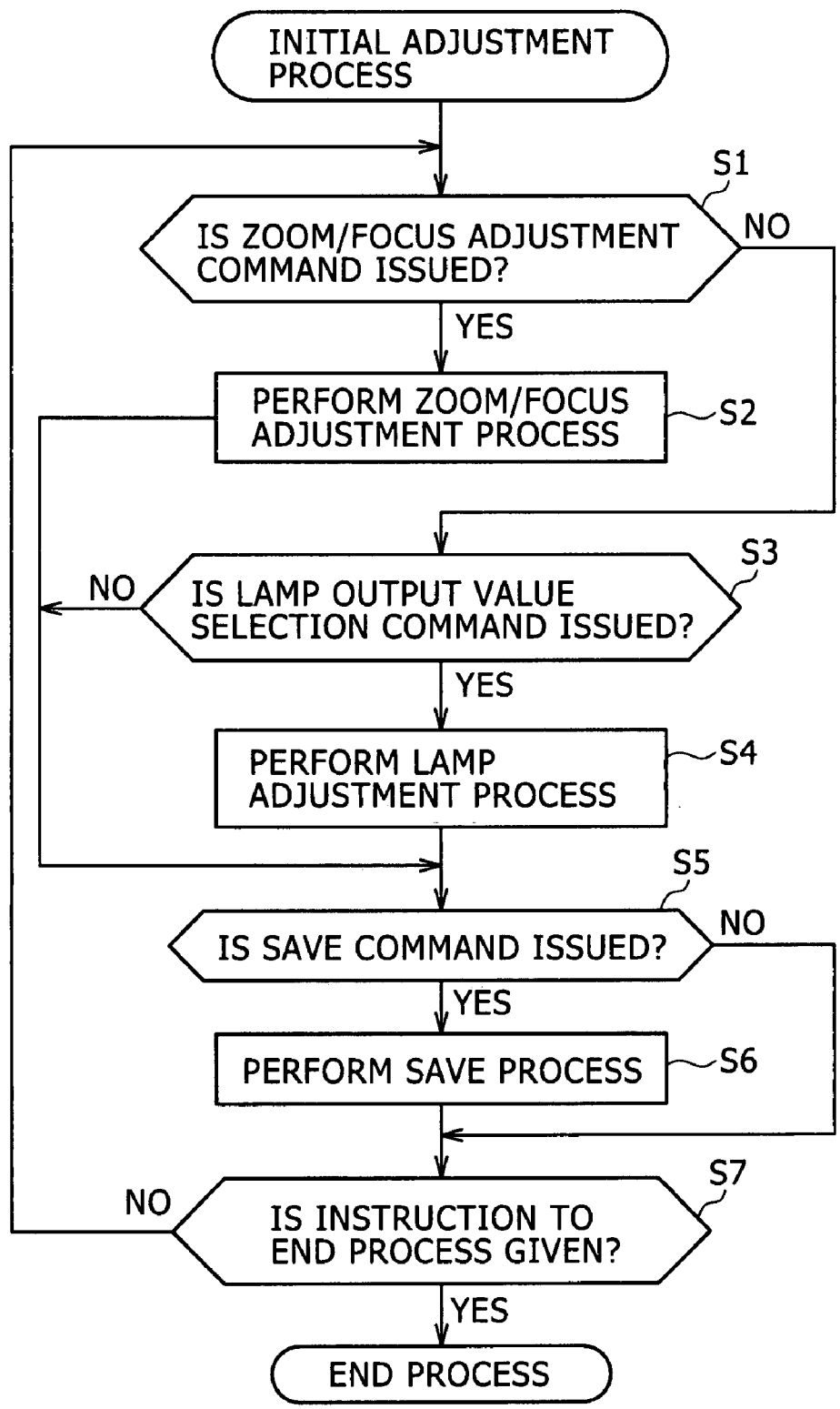
FIG. 3 is a flowchart of assistance in explaining an example of an initial adjustment process among processes performed by a projector in the information processing system of FIG. 2.

A case where the initial adjustment value for the type specified by the LOAD command is not recorded in the recording memory 19 means that the SAVE process in step S6 in the initial adjustment process of FIG. 3 described above has never been performed for the type specified by the LOAD command, that is, the operator or the like has not completed initial adjustment for the type specified by the LOAD command. Accordingly, in such a case, a result of determination in the process of step S22 is NO, and thus the process proceeds to step S23. In step S23, the CPU 11 performs a predetermined error process. Thereafter the process proceeds to step S27. A process from step S27 on down will be described later.

On the other hand, when the initial adjustment value for the type specified by the LOAD command is recorded in the recording memory 19, a result of determination in the process of step S22 is YES, and thus a process of steps S24 to S26 is performed as follows.

In step S24, the CPU 11 reads the initial adjustment value for the type specified by the LOAD command from the recording memory 19. In step S25, using the initial adjustment value, the CPU 11 performs each of the zoom/focus adjustment process and the lamp adjustment process.

Specifically, for example, as described above, the initial adjustment value read in the process of step S24 is the lamp output value and the output values of the position sensors 18-Z and 18-F which output values are registered in the recording memory 19 by the latest SAVE process of step S6 in FIG. 3 which latest SAVE process is performed for the type specified by the LOAD command (the output values at the time of the registration will hereinafter be referred to as registered values).

Hence, such a lamp registered value is used as lamp output value to perform the lamp adjustment process. As a result, luminance on the screen 2 at the time of initial adjustment is maintained as it is.

In addition, the respective registered values of the position sensors 18-Z and 18-F are used as respective target values to perform the zoom/focus adjustment process. That is, the rotation of the motors 17-Z and 17-F is controlled until the respective output values of the position sensors 18-Z and 18-F coincide with the respective registered values. As a result, the zoom magnification and the focus magnification at the time of the initial adjustment are reproduced.

In step S26, the CPU 11 determines whether the respective zoom/focus output values have reached the respective registered values within a set time.

As described above, the registered values refer to target values used in the zoom/focus adjustment process performed in step S25. The zoom/focus output values refer to the respective output values of the position sensors 18-Z and 18-F.

When the zoom/focus adjustment process is continued after the passage of the set time, or in other words, when the zoom lens 15-Z or the focus lens 15-F continues moving after the passage of the set time, a result of determination in the process of step S26 is NO, and a predetermined error process is performed in step S23.

On the other hand, when the zoom/focus adjustment process is completed before the passage of the set time, or in other words, when the zoom lens 15-Z or the focus lens 15-F stops moving before the passage of the set time, a result of determination in the process of step S26 is YES, and the process proceeds to step S27. As described above, also in other cases where a result of determination in step S21 is NO and where the process of step S23 is ended, the process proceeds to step S27.

In step S27, the CPU 11 determines whether an instruction to end the process is given.

A condition for the determination in step S27 is not specifically limited. However, suppose that in the present embodiment, for example, a condition that a state of power supply of the projector 1 be an off state is used as a condition for determining that the instruction to end the process is given.

That is, when the state of power supply of the projector 1 becomes the off state, it is determined in step S27 that the instruction to end the process is given, and thus the adjustment process is ended.

On the other hand, as long as the state of power supply of the projector 1 is an on state, it is determined in step S27 that the instruction to end the process is not given yet, and thus the process returns to step S21 to repeat the process from step S21 on down.

Incidentally, the determination process of step S22 described above is not particularly essential to the adjustment process, and may thus be omitted. In this case, a default value for each type is recorded in the recording memory 19 in advance as initial adjustment value before a first initial adjustment process of FIG. 3. When the LOAD command is issued in the process of step S21, the process of step S24 is forcefully performed at all times to read the initial adjustment value from the recording memory 19. Then, in the process of step S25, the zoom/focus adjustment process and the lamp adjustment process are performed using the initial adjustment value. Incidentally, when a default value is used as the initial adjustment value in the process of step S25, the focus lens 15-F or the zoom lens 15-Z may continue moving beyond an operation limit. Accordingly, when it is detected by a not shown operation limit switch on the lens 15, the operation of the focus lens 15-F or the zoom lens 15-Z may be stopped.

Respective examples of the initial adjustment process and the adjustment process have been described above with reference to FIG. 3 and FIG. 4, respectively.

Figure 5:
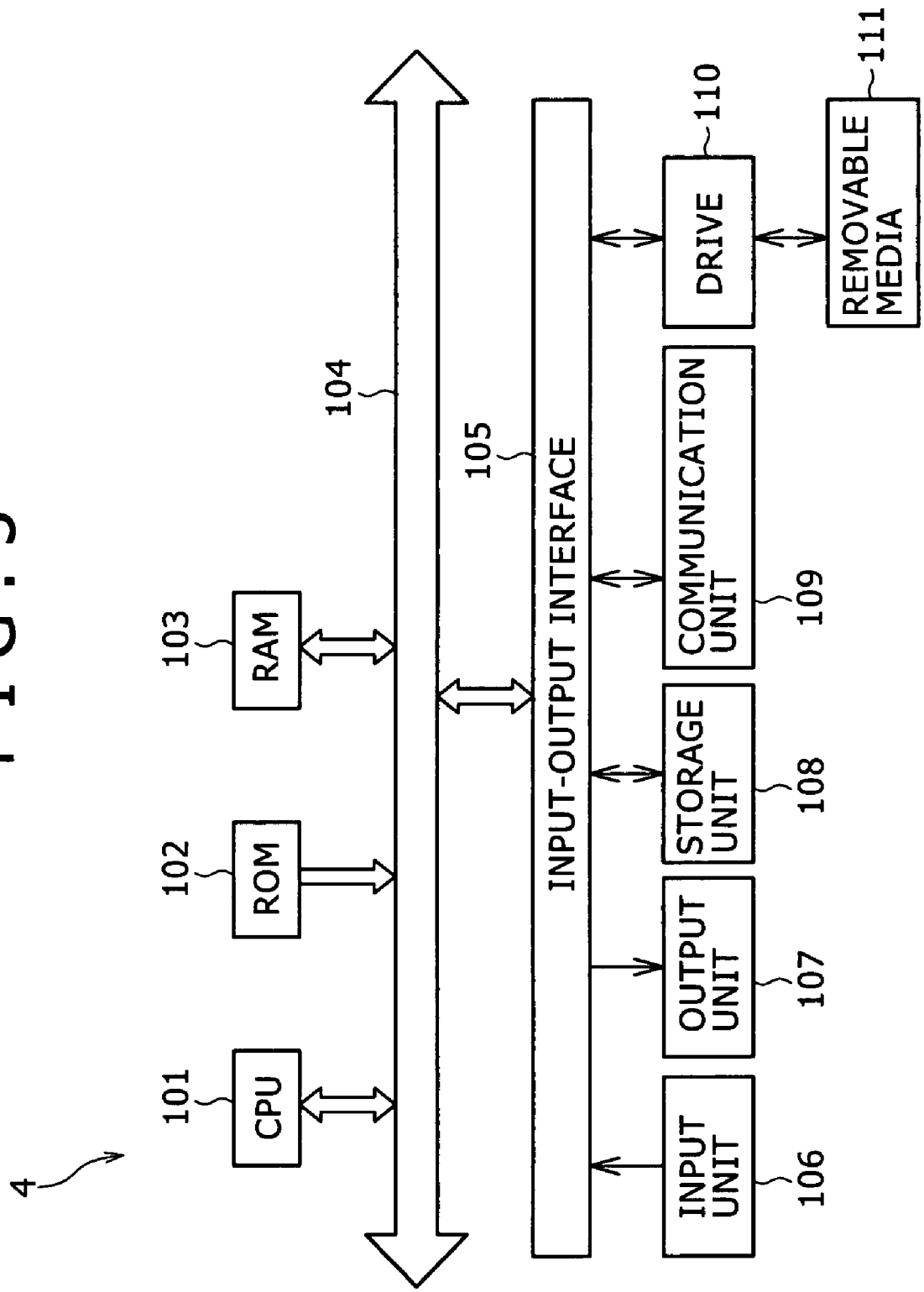
FIG. 5 is a block diagram showing an example of configuration of a personal computer in FIG. 2.

Of the initial adjustment process and the adjustment process, processes performed by the CPU 11 in FIG. 2 may be performed by a CPU 101 in FIG. 5 which CPU is included in another device, for example the personal computer 4-1 or 4-2 in FIG. 2. In other words, the functions of the CPU 11 in FIG. 2 may be delegated to the CPU 101 in FIG. 5 or the like.

FIG. 5 shows an example of configuration of the personal computer 4-1 or 4-2. Incidentally, when it is not particularly necessary to distinguish the personal computers 4-1 and 4-2 from each other, the personal computers 4-1 and 4-2 will hereinafter be referred to simply as the personal computer 4.

The CPU 101 in the personal computer 4 of FIG. 5 performs various processes according to a program recorded in a ROM 102 or a program loaded from a storage unit 108 into a RAM (Random Access Memory) 103. The RAM 103 also stores data and the like necessary for the CPU 101 to perform various processes as demanded.

The CPU 101, the ROM 102, and the RAM 103 are interconnected via a bus 104. The bus 104 is also connected with an input-output interface 105.

The input-output interface 105 is connected with an input unit 106 formed by a keyboard, a mouse, and the like, an output unit 107 formed by a display and the like, a storage unit 108 formed by a hard disk and the like, and a communication unit 109 formed by a modem, a terminal adapter and the like.

For example, the communication unit 109 in the personal computer 4-1 in FIG. 2 controls communication performed between the personal computer 4-1 and the projector 1 via the network 5 including the Internet. On the other hand, the communication unit 109 in the personal computer 4-2 controls serial communication performed between the personal computer 4-2 and the projector 1.

The input-output interface 105 is also connected with a drive 110 as necessary. A removable recording medium 111 formed by a magnetic disk, an optical disk, a magneto-optical disk, a semiconductor memory or the like is loaded into the drive 110 as necessary. A computer program read from the removable recording medium 111 is installed onto the storage unit 108 as necessary.

Figure 4:
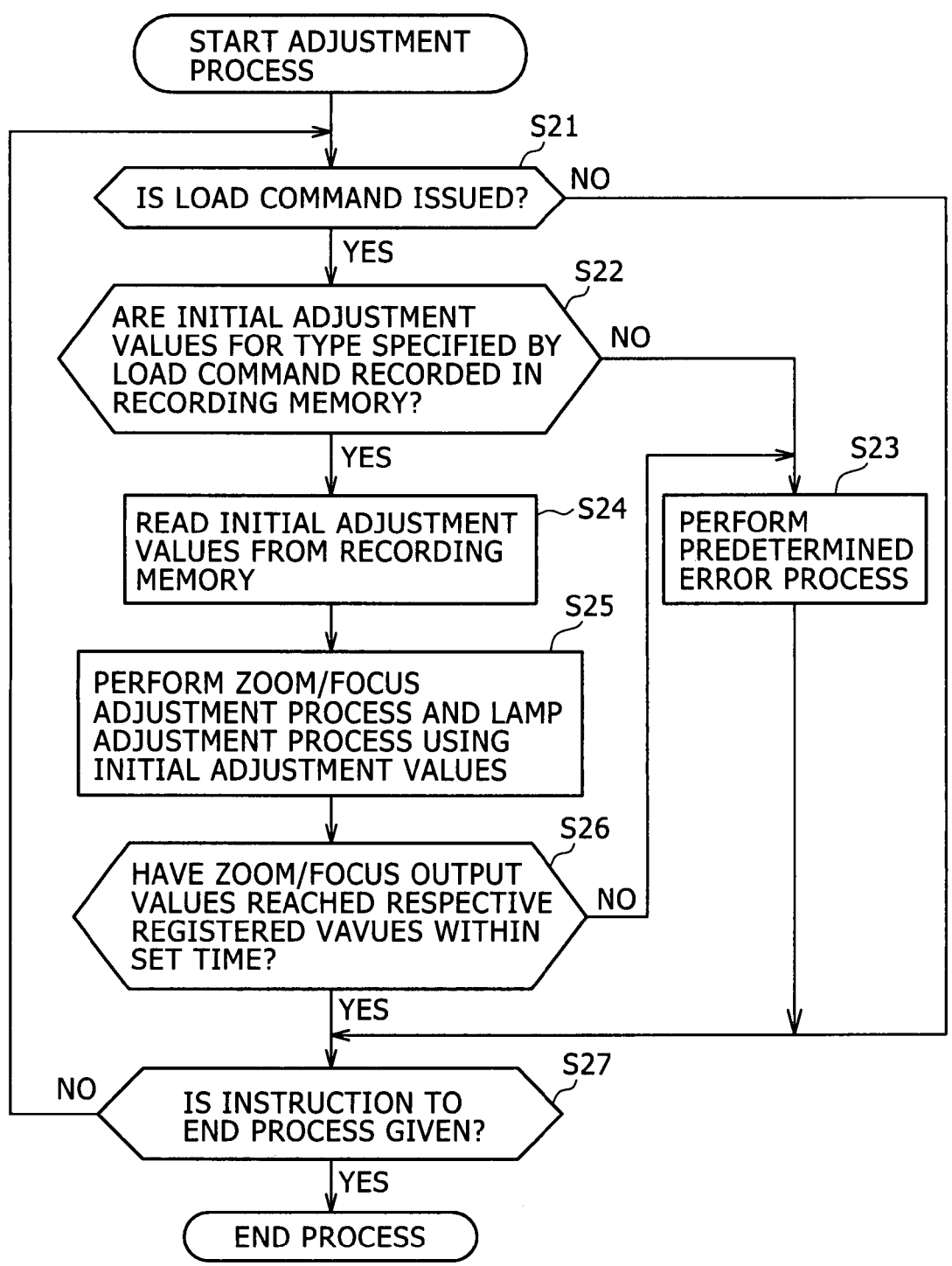
FIG. 4 is a flowchart of assistance in explaining an example of an adjustment process among the processes performed by the projector in the information processing system of FIG. 2.

Further, the series of processes described above, for example the initial adjustment process of FIG. 3 and the adjustment process of FIG. 4 can be performed not only by a circuit that performs control processes by software, such as the CPU 11 in FIG. 2, the CPU 101 in FIG. 5, or the like but also by a circuit formed by hardware, that is, a circuit that performs control processes by hardware. Incidentally, a circuit that performs control processes by software and a circuit that performs control processes by hardware will hereinafter be referred to as a control circuit.

In other words, the series of processes described above can be carried out by hardware and also carried out by software.

When the series of processes is to be carried out by software, a program constituting the software is installed from a network or a recording medium onto a computer incorporated in special hardware, or for example a general-purpose personal computer that can perform various functions by installing various programs thereon.

As shown in FIG. 5, the recording medium including such a program is not only formed by the removable recording medium (packaged media) 111 distributed to viewers separately from the device proper to provide the program and having the program recorded thereon, the removable recording medium including a magnetic disk (including floppy disks), an optical disk (including CD-ROM (Compact Disk-Read Only Memory) and DVD (Digital Versatile Disk)), a magneto-optical disk (including MD (Mini-Disk)), a semiconductor memory or the like, but also formed by the ROM 102, the hard disk included in the storage unit 108, or the like that is provided to the viewer in a state of being preincorporated in the device proper and which has the program recorded thereon.

While the present invention has been described above, in the present specification, the steps describing the program recorded on the recording medium include not only processes carried out in time series in the described order but also processes carried out in parallel or individually and not necessarily in time series.

In addition, in the present specification, a system refers to an apparatus as a whole formed by a plurality of devices or processing units.

A case where the present invention is applied to digital cinema has been described above.

In general, an information system including a cinema projector in digital cinema is demanded to meet the following first to fourth conditions in contrast to film movies in related art. The first condition is a condition that each of various types of contents be able to be projected. The second condition is a condition that day-to-day operation obviating a need for human labor be made possible. The third condition is a condition that cost for showing a movie be reduced. The fourth condition is a condition that simple and accurate adjustment saving labor be able to be made.

Even a cinema projector in the past satisfies the first condition, and satisfies the fourth condition in that a problem of "cost and labor of preparing and setting a plurality of lenses, a turret and the like", which problem is associated with a film projector in the past.

However, the cinema projector has a problem of "requiring complex adjustment each time video contents are changed", as described above. Because the cinema projector in the past has such a problem, it is hard to say that the cinema projector in the past satisfies the second condition and the third condition.

On the other hand, the projector 1 in FIG. 2 or the like satisfies the first condition and the fourth condition exactly like the cinema projector in the past. Further, as described above, after the operator or the like once makes an initial adjustment for each type of video content, that is, after the operator or the like makes the projector 1 perform the initial adjustment process in FIG. 3 or the like, each initial adjustment value is registered in the recording memory 19. Therefore, at a time of changing video contents, it suffices for the operator or the like to perform a simple operation of issuing a LOAD command for a type to which the change is made. That is, after such a LOAD command is issued, the operator or the like does not perform any particular operation, and the projector 1 automatically performs the adjustment process of FIG. 4 or the like. Thus, the projector 1 in FIG. 2 or the like can solve the problems associated with cinema contents in related art. That is, when using the projector 1 in FIG. 2 or the like, the operator or the like do not need to make complex adjustment each time video contents are changed. In this respect, the projector 1 in FIG. 2 or the like further satisfies the second condition and the third condition.

Thus, the projector 1 in FIG. 2 or the like can satisfy all of the first to fourth conditions demanded of an information system including a cinema projector in digital cinema. The projector 1 in FIG. 2 or the like is therefore suitable for application to digital cinema.

Of course, the present invention is not limited to the example of FIG. 2, and is applicable to image forming devices in general that form an image on an image forming object. In other words, the projector 1 for digital cinema in the example of FIG. 2 is a mere embodiment of an image forming device when the screen 2 is employed as an image forming object.

It should be understood by those skilled in the art that various modifications, combinations, sub-combinations and alterations may occur depending on design requirements and other factors insofar as they are within the scope of the appended claims or the equivalents thereof.

What is claimed is:

1. An image forming device for forming an image on an image forming object by irradiating said image forming object with a luminous flux corresponding to said image, said image forming device comprising:
    a lens configured to irradiate said image forming object with said luminous flux, the lens having a zoom lens that changes a zoom magnification by changing a position of the zoom lens and a focus lens that changes a focus magnification by changing a position of the focus lens;
    a driving system configured to drive each of said zoom lens and said focus lens;
    a position sensor configured to detect respective positions of said zoom lens and said focus lens;
    a controlling circuit configured to make said respective positions detected by said position sensor coincide with respective target values by receiving a predetermined command and controlling said driving system; and
    a memory in which information can be recorded;
    wherein when said controlling circuit receives a first command to move at least one of said zoom lens and said focus lens, said controlling circuit sets said target values on a basis of the first command, controls said driving system using the set target values, and performs control to record said respective positions detected by said position sensor in timing of ending the controlling of said driving system in said memory as a first adjustment value, and
    when said controlling circuit receives a second command to read contents of said memory, said controlling circuit reads said first adjustment value from said memory, and controls said driving system using said first adjustment value as said target values.

2. The image forming device according to claim 1, further comprising:
    a lamp as a source that produces said luminous flux; and
    a lamp power supply configured to supply power to said lamp;
    wherein when said controlling circuit further receives a third command to change the luminous flux from said lamp, said controlling circuit changes the luminous flux from said lamp by controlling the power supplied by said lamp power supply, and performs control to record a value indicating the power supplied in timing of ending the controlling of the power in said memory as a second adjustment value in correspondence with said first adjustment value, and
    when said controlling circuit receives said second command, said controlling circuit further reads said second adjustment value in addition to said first adjustment value from said memory, and further performs control to make the power supplied by said lamp power supply become power corresponding to said second adjustment value.

3. The image forming device according to claim 2,
    wherein said first to third commands are issued from another device, and
    said image forming device further includes a communicating circuit configured to receive said first to third commands from said other device and providing said first to third commands to said controlling circuit.

4. The image forming device according to claim 3,
    wherein said communicating circuit and said other device are connected to each other via a predetermined network.

5. The image forming device according to claim 1,
    wherein said image forming device is a projector using a screen as said image forming object.

6. An image forming method of an image forming device for forming an image on an image forming object by irradiating said image forming object with a luminous flux corresponding to said image, said image forming device including a lens configured to irradiate said image forming object with said luminous flux, the lens having a zoom lens that changes a zoom magnification by changing a position of the zoom lens and a focus lens that changes a focus magnification by changing a position of the focus lens, a driving system configured to drive each of said zoom lens and said focus lens, a position sensor configured to detect respective positions of said zoom lens and said focus lens, a controlling circuit configured to make said respective positions detected by said position sensor coincide with respective target values by receiving a predetermined command and controlling said driving system, and a memory in which information can be recorded, said image forming method comprising the steps of:
    setting said target values on a basis of the first command, when said controlling circuit receives a first command to move at least one of said zoom lens and said focus lens;
    controlling said driving system using the set target values;
    performing control to record said respective positions detected by said position sensor in timing of ending the controlling of said driving system in said memory as an adjustment value;
    reading said adjustment value from said memory, when said controlling circuit receives a second command to read contents of said memory; and
    controlling said driving system using said adjustment value as said target values.

7. An image forming device for forming an image on an image forming object by irradiating said image forming object with a luminous flux corresponding to said image, said image forming device comprising:
    lens means for irradiating said image forming object with said luminous flux, the lens means including a zoom lens that changes a zoom magnification by changing a position of the zoom lens and a focus lens that changes a focus magnification by changing a position of the focus lens;
    driving means for driving each of said zoom lens and said focus lens;
    position sensing means for detecting respective positions of said zoom lens and said focus lens;
    controlling means for making said respective positions detected by said position sensing means coincide with respective target values by receiving a predetermined command and controlling said driving means; and
    memory means in which information can be recorded;

wherein when said controlling means receives a first command to move at least one of said zoom lens and said focus lens, said controlling means sets said target values on a basis of the first command, controls said driving means using the set target values, and performs control to record said respective positions detected by said position sensing means in timing of ending the controlling of said driving means in said memory means as a first adjustment value, and when said controlling means receives a second command to read contents of said memory means, said controlling means reads said first adjustment value from said memory means, and controls said driving means using said first adjustment value as said target values.

* * * * *